(12) United States Patent
Taylor

(10) Patent No.: US 7,775,346 B1
(45) Date of Patent: Aug. 17, 2010

(54) FOOD BUFFET TABLE SYSTEM

(76) Inventor: Shirley D. Taylor, 5109 Avenue K., Brooklyn, NY (US) 11234

( * ) Notice: Subject to any disclaimer, the term of this patent is extended or adjusted under 35 U.S.C. 154(b) by 373 days.

(21) Appl. No.: 11/835,053

(22) Filed: Aug. 7, 2007

(51) Int. Cl.
*B65G 15/02* (2006.01)
(52) U.S. Cl. .................... 198/831; 198/539; 186/49
(58) Field of Classification Search ............. 198/539, 198/584, 606, 831; 189/49
See application file for complete search history.

(56) References Cited

U.S. PATENT DOCUMENTS

| | | | |
|---|---|---|---|
| 2,037,815 A | | 4/1936 | Ora |
| 3,237,754 A | * | 3/1966 | Kraft, Jr. et al. ............ 198/831 |
| 3,503,346 A | | 3/1970 | Chan |
| 3,874,479 A | | 4/1975 | Onori et al. |
| 3,901,355 A | * | 8/1975 | Shiraishi ...................... 186/44 |
| 4,101,020 A | * | 7/1978 | Langen ..................... 198/469.1 |
| 4,179,026 A | * | 12/1979 | de Vries ...................... 198/834 |
| 4,216,845 A | | 8/1980 | Tashman et al. |
| 4,617,778 A | * | 10/1986 | Blackman .................... 53/391 |
| 4,765,440 A | | 8/1988 | Tashman |
| 4,930,621 A | * | 6/1990 | Brown et al. ............... 198/831 |
| 5,456,349 A | * | 10/1995 | Axmann ..................... 198/831 |
| 5,682,975 A | * | 11/1997 | Wells ......................... 198/831 |
| 5,988,362 A | * | 11/1999 | Nakamura et al. ........... 198/831 |
| 6,170,643 B1 | | 1/2001 | Shah |
| D439,770 S | | 4/2001 | McDaniel |
| 6,484,871 B2 | * | 11/2002 | van Leeuwen ............... 198/831 |
| 6,497,305 B2 | * | 12/2002 | Beach ........................ 186/49 |
| 6,935,489 B2 | | 8/2005 | Kawasaki |
| 6,937,922 B2 | * | 8/2005 | Shimizu ..................... 700/230 |
| 7,073,660 B1 | * | 7/2006 | Hishinuma .................. 198/831 |
| 7,150,352 B2 | * | 12/2006 | Cotter et al. ................ 198/831 |
| 7,168,556 B2 | * | 1/2007 | Spoeler ...................... 198/831 |
| 7,497,326 B2 | * | 3/2009 | McGuire et al. ......... 198/861.1 |
| 7,556,144 B2 | * | 7/2009 | Cotter et al. ................ 198/835 |

* cited by examiner

*Primary Examiner*—Douglas A Hess

(57) ABSTRACT

A food buffet table system for conveying food articles around a tabletop to allow a person to access the food articles without reaching across the tabletop includes a base being positioned on and that extends upwardly from a support surface. A tabletop is coupled to the base and positioned above the support surface. The tabletop has a channel that extends into the tabletop through an upper surface of the tabletop in an approximate oval shape along the tabletop. A plurality of conveyor assemblies is positioned in and extends along the channel to receive and support the food articles. The conveyor assemblies are actuated to convey the food articles in an approximate oval path around the tabletop. A pair of drive assemblies is positioned in the tabletop. A plurality of the conveyor assemblies is coupled to one of the drive assemblies to actuate the conveyor assemblies.

12 Claims, 3 Drawing Sheets

FOOD BUFFET TABLE SYSTEM

BACKGROUND OF THE INVENTION

1. Field of the Invention

The present invention relates to food service conveyors and more particularly pertains to a new food service conveyor for conveying food articles around a tabletop to allow a person to access the food articles without reaching across the tabletop.

2. Description of the Prior Art

The use of food service conveyors is known in the prior art. While these devices fulfill their respective, particular objectives and requirements, the need remains for a system that has certain improved features that allow for the system to be actuated conveying food articles in one of two directions around a tabletop of the system. Additionally, the system should include control units that are positioned on a support surface and are actuated by a foot of the person to actuate the system to convey the food articles.

SUMMARY OF THE INVENTION

The present invention meets the needs presented above by generally comprising a base being positioned on and that extends upwardly from a support surface. A tabletop is coupled to the base and positioned above the support surface. The tabletop has a channel that extends into the tabletop through an upper surface of the tabletop. The channel extends in an approximate oval shape along the tabletop. A plurality of conveyor assemblies is positioned in and extends along the channel. The conveyor assemblies receive and support food articles. The conveyor assemblies are actuated to convey the food articles in an approximate oval path around the tabletop. A pair of drive assemblies is positioned in the tabletop. A plurality of the conveyor assemblies is coupled to one of the drive assemblies. The drive assemblies are actuated to actuate the conveyor assemblies to convey the food articles around the tabletop.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
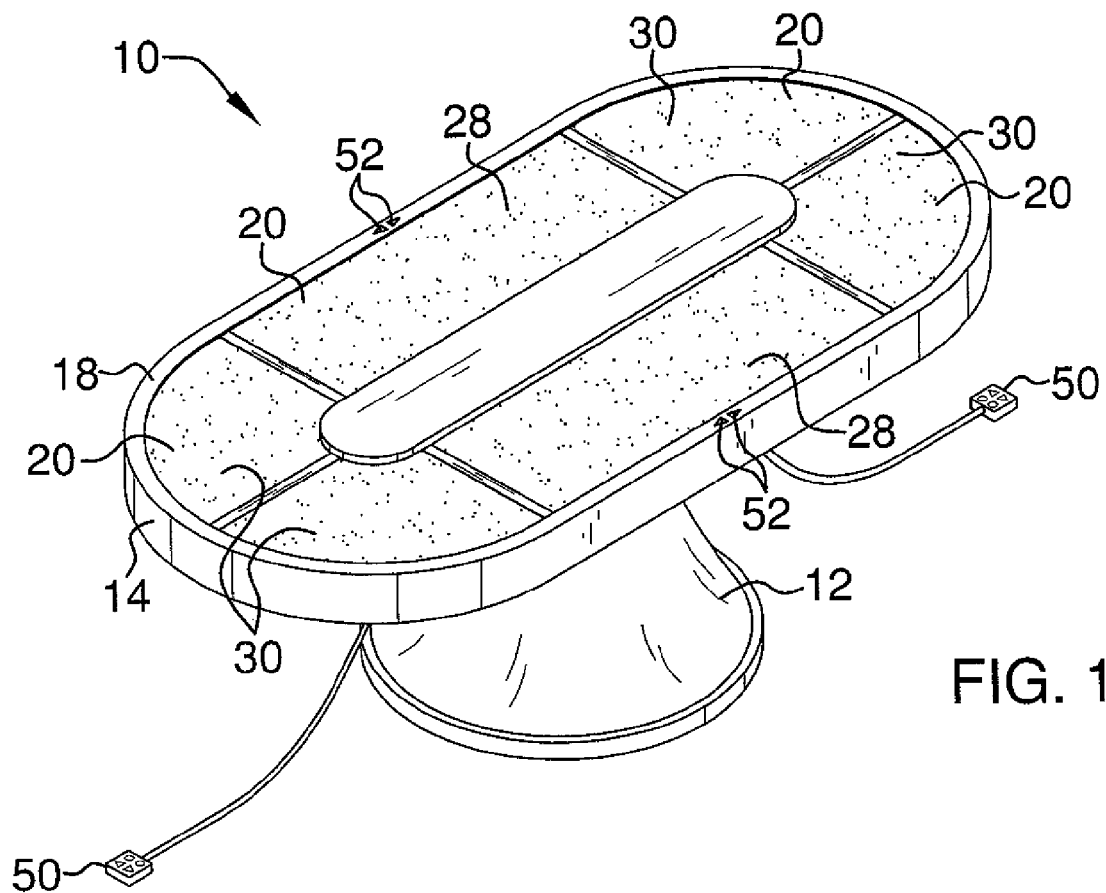
FIG. 1 is a perspective view of a food buffet table system according to the present invention.
Figure 2:
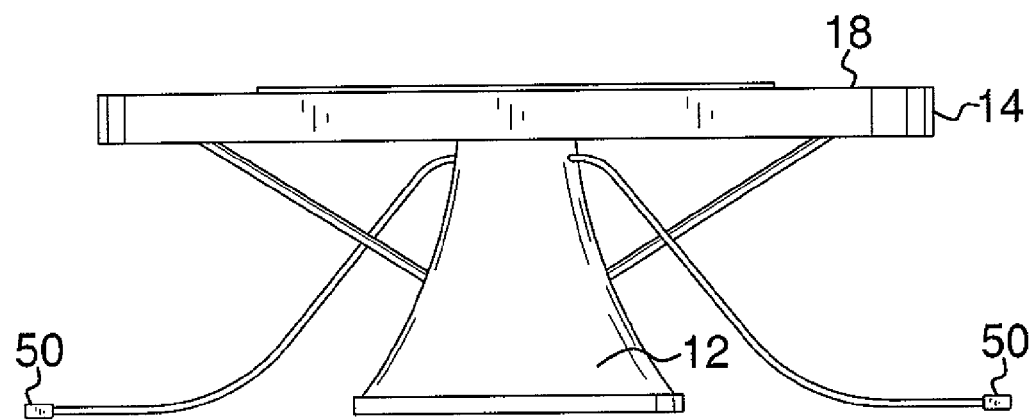
FIG. 2 is a side view of the present invention.
Figure 3:
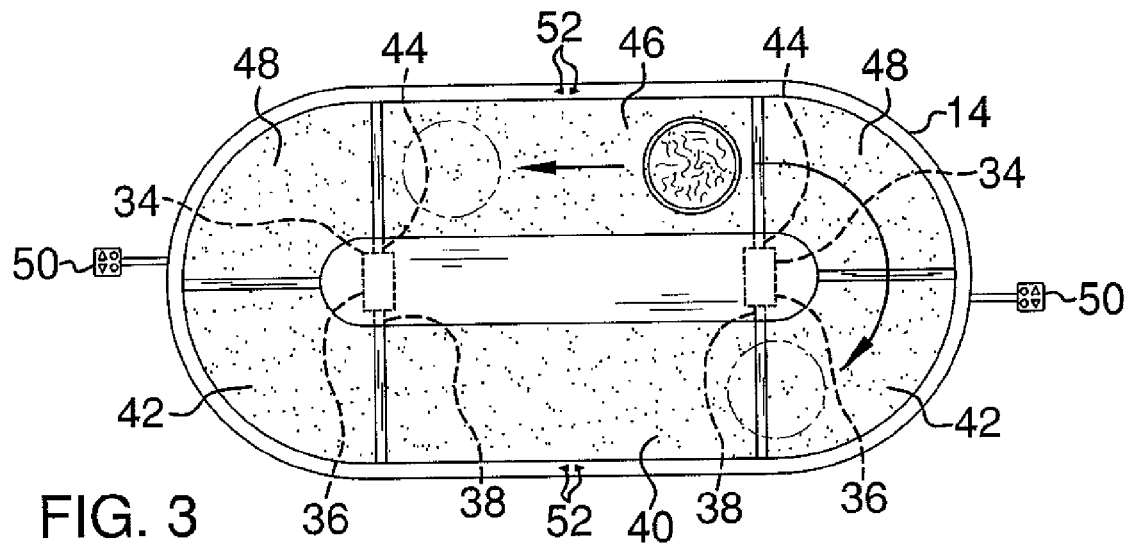
FIG. 3 is a top view of the present invention.
Figure 4:
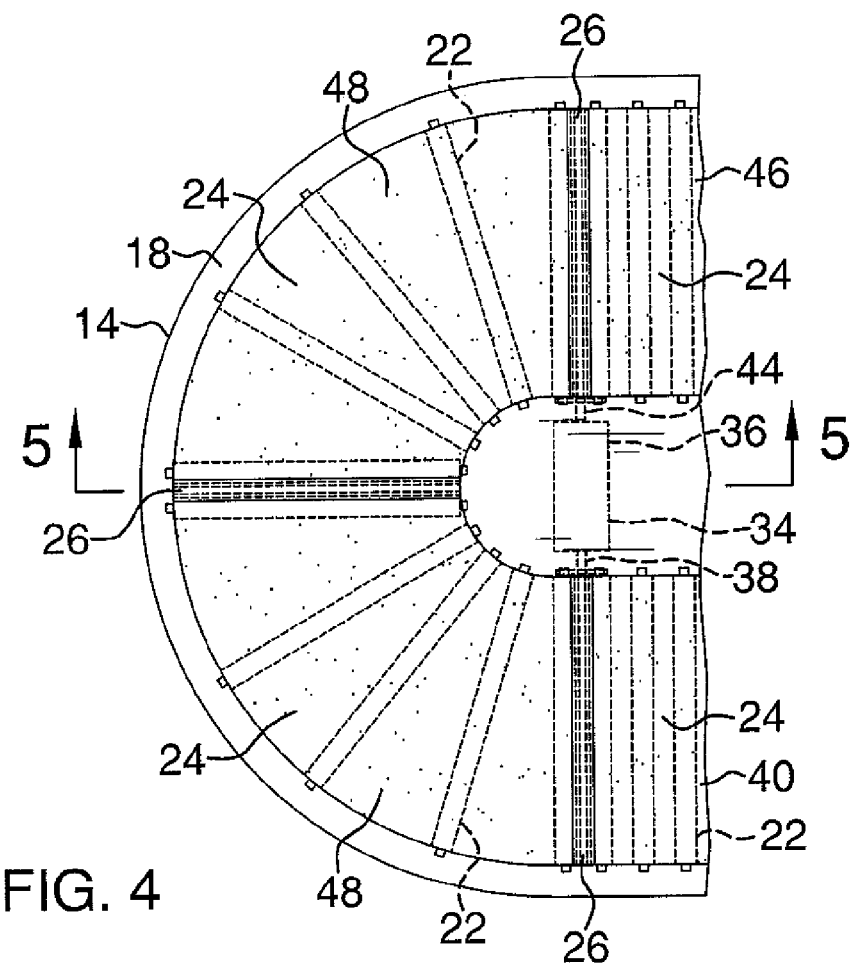
FIG. 4 is an enlarged top view of a portion of the conveyor assemblies of the present invention.
Figure 5:
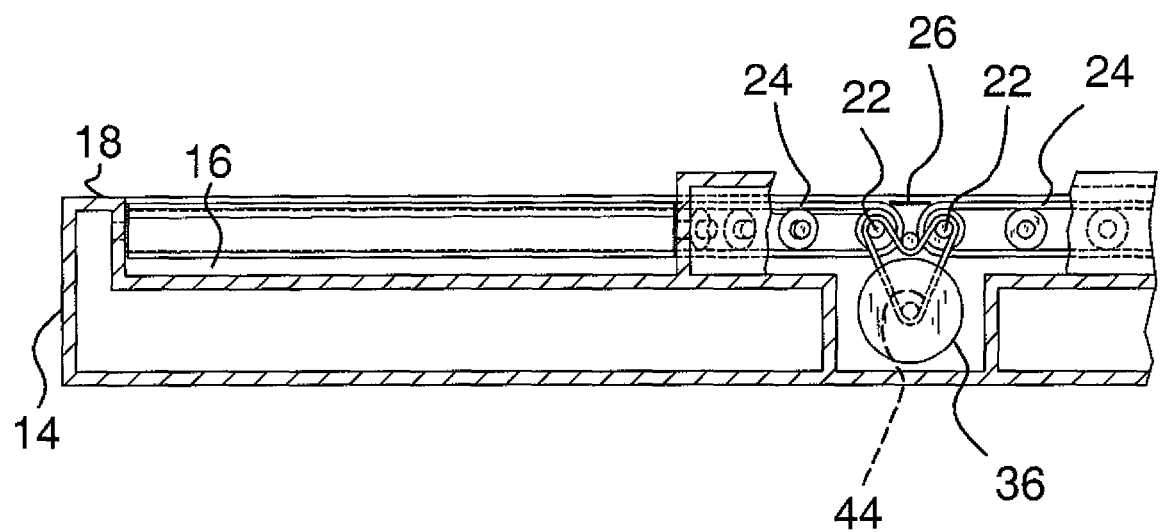
FIG. 5 is a cross-sectional view of the present invention taken along line 5-5 of FIG. 4.

With reference now to the drawings, and in particular to FIGS. 1 through 5 thereof, a new food service conveyor embodying the principles and concepts of the present invention and generally designated by the reference numeral 10 will be described.

As best illustrated in FIGS. 1 through 5, the food buffet table system 10 generally comprises a base 12 being positioned on and upwardly extends from a support surface. A tabletop 14 is coupled to the base 12 and positioned above the support surface. The tabletop 14 has a channel 16 that extends into the tabletop 14 through an upper surface 18 of the tabletop 14. The channel 16 extends in an approximate oval shape along the tabletop 14.

A plurality of conveyor assemblies 20 is positioned in and extends along the channel 16. The conveyor assemblies 20 receive and support food articles. The conveyor assemblies 20 are actuated to convey the food articles in an approximate oval path around the tabletop 14. Each of the conveyor assemblies 20 includes a plurality of rollers 22 rotatably coupled to the tabletop 14. Each of the rollers 22 is positioned in and extends across a width of the channel 16.

Each of the conveyor assemblies 20 also includes a continuous belt 24 that extends around the rollers 22. The continuous belt 24 rolls in a continuous loop when one of the rollers 22 is rotated. The continuous belt 24 receives and supports the food articles when the food articles are placed on the conveyor assemblies 20. The continuous belt 24 transports the food articles along the associated one of the conveyor assemblies 20 when the continuous belt 24 rolls along the rollers 22. The continuous belt 24 is comprised of a friction enhancing material to inhibit slipping of the food articles on the continuous belt 24. A transition plate 26 is coupled to the tabletop 14 and positioned adjacent the upper surface 18 of the tabletop 14. The transition plate 26 is positioned over gaps between an adjacently positioned pair of the conveyor assemblies 20. The transition plate 26 supports the food articles and inhibits the food articles from falling between the conveyor assemblies 20 when the food articles are conveyed across the gap.

The conveyor assemblies 20 include a pair of straight conveyor assemblies 28 and four arcuate conveyor assemblies 30. A pair of the arcuate conveyor assemblies 30 is positioned between aligned ends of the straight conveyor assemblies 28. The adjacently positioned pair of the arcuate conveyor assemblies 30 permits food articles to pass from one of the straight conveyor assemblies 28 along the arcuate conveyor assemblies 30 to the other on of the straight conveyor assemblies 28.

A pair of drive assemblies 34 is positioned in the tabletop 14. A plurality of the conveyor assemblies 20 is coupled to one of the drive assemblies 34. The drive assemblies 34 are actuated to actuate the conveyor assemblies 20 to convey the food articles around the tabletop 14. Each of the drive assemblies 34 includes a motor 36 positioned in the tabletop 14. The motor 36 is electrically coupled to a power source.

Each of the drive assemblies 34 also includes a first drive axle 38 mechanically coupled to the motor 36. The first drive axle 38 is rotated by the motor 36 when the motor 36 is actuated. The first drive axle 38 is mechanically coupled to a first one of the straight conveyor assemblies 40 and a first one of the arcuate conveyor assemblies 42 to actuate the conveyor assemblies 20 to convey the food articles.

Each of the drive assemblies 34 additionally includes a second drive axle 44 mechanically coupled to the motor 36 opposite the first drive axle 38. The second drive axle 44 is rotated by the motor 36 in a direction opposite of the first drive axle 38 when the motor 36 is actuated. The second drive axle 44 is coupled to a second one of the straight conveyor assemblies 46 and a second one of the arcuate conveyor assemblies 48 to actuate the conveyor assemblies 20 to convey the food articles.

A plurality of control units 50 is electrically coupled to the drive assemblies 34. The control units 50 are positioned on the support surface to be actuated by a foot of a person. Each of the control units 50 is actuated to control a direction and speed that the conveyor assemblies 20 convey the food articles. A plurality of control buttons 52 is coupled to the tabletop 14. Each of the control buttons 52 is electrically coupled to the drive assemblies 34. The control buttons 52 are actuated to control a direction that the conveyor assemblies 20 convey the food articles when the control buttons 52 are actuated.

In use, the food articles are placed on the conveyor assemblies 20. A person can then actuate either of the control units 50 or the control buttons 52 to actuate the conveyor assemblies 20 to transport the food articles around the tabletop 14. As the food articles pass, the person can retrieve the desired food article from the conveyor assemblies 20.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A food buffet table system for permitting access to food articles, said system comprising:
a base being positioned on and extending upwardly from a support surface;
a tabletop being coupled to said base and positioned above the support surface, said tabletop having a channel extending into said tabletop through an upper surface of said tabletop, said channel being positioned above a lower surface of said tabletop so that the lower surface will not allow food articles to fall to the support surface, said channel extending in an approximate oval shape along said tabletop, said channel extending around and encompassing a stationary central area of said upper surface of said tabletop, wherein articles are positionable on said central area in a spaced relationship from said channel;
a plurality of conveyor assemblies being positioned in and extending along said channel, said conveyor assemblies receiving and supporting the food articles, said conveyor assemblies being actuated to convey the food articles in an approximate oval path around said tabletop; and
a pair of drive assemblies being positioned underneath and within said central area, a plurality of said conveyor assemblies being coupled to one of said drive assemblies, said drive assemblies being actuated to actuate said conveyor assemblies to convey the food articles around said tabletop.

2. The system according to claim 1, wherein each of said conveyor assemblies includes a plurality of rollers being rotatably coupled to said tabletop, each of said rollers being positioned in and extending across a width of said channel.

3. The system according to claim 2, wherein each of said conveyor assemblies includes a continuous belt being extended around said rollers, said continuous belt rolling in a continuous loop when one of said rollers is rotated, said continuous belt receiving and supporting the food articles when the food articles are placed on said conveyor assemblies, said continuous belt transporting the food articles along the associated one of said conveyor assemblies when said continuous belt rolls along said rollers.

4. The system according to claim 3, wherein said continuous belt is comprised of a friction enhancing material to inhibit slipping of the food articles on said continuous belt.

5. The system according to claim 3, wherein each of said conveyor assemblies includes a transition plate being coupled to said tabletop and positioned adjacent said upper surface of said tabletop, said transition plate being positioned over gaps between an adjacently positioned pair of said conveyor assemblies, said transition plate supporting the food articles and inhibiting the food articles from falling between said conveyor assemblies when the food articles are conveyed across the gap.

6. The system according to claim 1, wherein said conveyor assemblies include a pair of straight conveyor assemblies and four arcuate conveyor assemblies, a pair of said arcuate conveyor assemblies being positioned between aligned ends of said straight conveyor assemblies, the adjacently positioned pair of said arcuate conveyor assemblies permitting food articles to pass from one of said straight conveyor assemblies along said arcuate conveyor assemblies to the other one of said straight conveyor assemblies.

7. The system according to claim 6, wherein each of said drive assemblies includes a motor being positioned in said tabletop, said motor being electrically coupled to a power source.

8. The system according to claim 7, wherein each of said drive assemblies includes a first drive axle being mechanically coupled to said motor, said first drive axle being rotated by said motor when said motor is actuated, said first drive axle being mechanically coupled to a first one of said straight conveyor assemblies and a first one of said arcuate conveyor assemblies to actuate the conveyor assemblies to convey the food articles.

9. The system according to claim 8, wherein each of said drive assemblies includes a second drive axle being mechanically coupled to said motor opposite said first drive axle, said second drive axle being rotated by said motor in a direction opposite of said first drive axle when said motor is actuated, said second drive axle being coupled to a second one of said straight conveyor assemblies and a second one of said arcuate conveyor assemblies to actuate said conveyor assemblies to convey the food articles.

10. The system according to claim 1, further comprising a plurality of control units being electrically coupled to said drive assemblies, said control units being positioned on the support surface to be actuated by a foot of a person, each of said control units being actuated to control a direction and speed that said conveyor assemblies convey the food articles.

11. The system according to claim 1, further comprising a plurality of control buttons being coupled to said tabletop, each of said control buttons being electrically coupled to said drive assemblies, said control buttons being actuated to control a direction that said conveyor assemblies convey the food articles when said control buttons are actuated.

12. A food buffet table system for permitting access to food articles, said system comprising:
- a base being positioned on and extending upwardly from a support surface;
- a tabletop being coupled to said base and positioned above the support surface, said tabletop having a channel extending into said tabletop through an upper surface of said tabletop, said channel being positioned above a lower surface of said tabletop, said channel extending in an approximate oval shape along said tabletop, said channel extending around and encompassing a central area of said upper surface of said tabletop, wherein articles are positionable on said central area in a spaced relationship from said channel;
- a plurality of conveyor assemblies being positioned in and extending along said channel, said conveyor assemblies receiving and supporting the food articles, said conveyor assemblies being actuated to convey the food articles in an approximate oval path around said tabletop, each of said conveyor assemblies comprising;
  - a plurality of rollers being rotatably coupled to said tabletop, each of said rollers being positioned in and extending across a width of said channel;
  - a continuous belt being extended around said rollers, said continuous belt rolling in a continuous loop when one of said rollers is rotated, said continuous belt receiving and supporting the food articles when the food articles are placed on said conveyor assemblies, said continuous belt transporting the food articles along the associated one of said conveyor assemblies when said continuous belt rolls along said rollers, said continuous belt being comprised of a friction enhancing material to inhibit slipping of the food articles on said continuous belt;
  - a transition plate being coupled to said tabletop and positioned adjacent said upper surface of said tabletop, said transition plate being positioned over gaps between an adjacently positioned pair of said conveyor assemblies, said transition plate supporting the food articles and inhibiting the food articles from falling between said conveyor assemblies when the food articles are conveyed across the gap;
- said conveyor assemblies including a pair of straight conveyor assemblies and four arcuate conveyor assemblies, a pair of said arcuate conveyor assemblies being positioned between aligned ends of said straight conveyor assemblies, the adjacently positioned pair of said arcuate conveyor assemblies permitting food articles to pass from one of said straight conveyor assemblies along said arcuate conveyor assemblies to the other one of said straight conveyor assemblies;
- a pair of drive assemblies being positioned in said tabletop, a plurality of said conveyor assemblies being coupled to one of said drive assemblies, said drive assemblies being actuated to actuate said conveyor assemblies to convey the food articles around said tabletop, each of said drive assemblies comprising;
  - a motor being positioned in said tabletop, said motor being electrically coupled to a power source;
  - a first drive axle being mechanically coupled to said motor, said first drive axle being rotated by said motor when said motor is actuated, said first drive axle being mechanically coupled to a first one of said straight conveyor assemblies and a first one of said arcuate conveyor assemblies to actuate the conveyor assemblies to convey the food articles;
  - a second drive axle being mechanically coupled to said motor opposite said first drive axle, said second drive axle being rotated by said motor in a direction opposite of said first drive axle when said motor is actuated, said second drive axle being coupled to a second one of said straight conveyor assemblies and a second one of said arcuate conveyor assemblies to actuate said conveyor assemblies to convey the food articles;
- a plurality of control units being electrically coupled to said drive assemblies, said control units being positioned on the support surface to be actuated by a foot of a person, each of said control units being actuated to control a direction and speed that said conveyor assemblies convey the food articles; and
- a plurality of control buttons being coupled to said tabletop, each of said control buttons being electrically coupled to said drive assemblies, said control buttons being actuated to control a direction that said conveyor assemblies convey the food articles when said control buttons are actuated.

* * * * *